June 24, 1958  E. E. SCHNELL  2,840,282
GRAIN DRILL

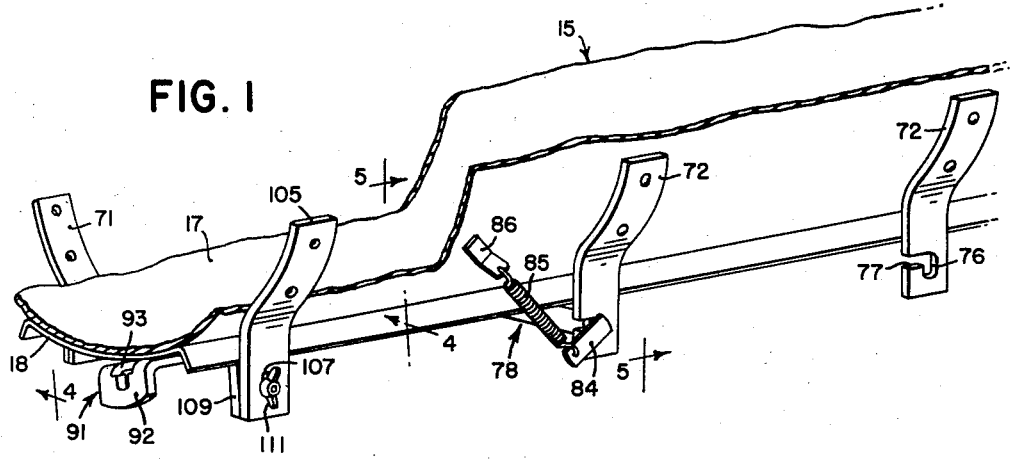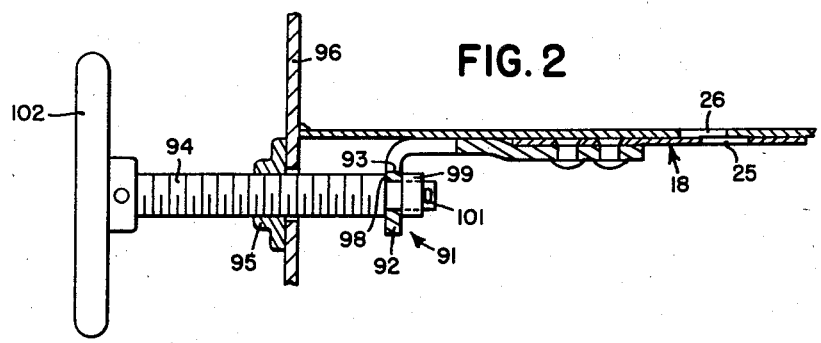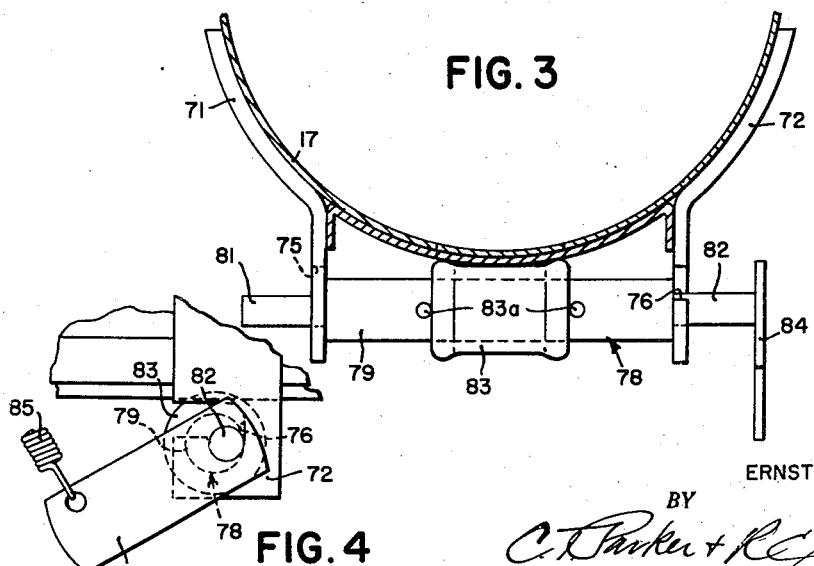

Original Filed Feb. 1, 1955  2 Sheets-Sheet 2

INVENTOR.
ERNST E. SCHNELL
BY
ATTORNEYS

United States Patent Office 2,840,282
Patented June 24, 1958

2,840,282

GRAIN DRILL

Ernst E. Schnell, West Bend, Wis., assignor to John Deere Van Brunt Company, Horicon, Wis., a corporation of Wisconsin Original application February 1, 1955, Serial No. 485,493. Divided and this application March 13, 1956, Serial No. 571,294

14 Claims. (Cl. 222—485)

This application is a division of our copending application Ser. No. 485,493, filed February 1, 1955.

The present invention relates generally to agricultural implements and more particularly to material-dispensing implements, such as fertilizer distributors, for example, constructed and arranged to be drawn across a field for the purpose of distributing material, such as fertilizer or the like, onto the field.

The object and general nature of the present invention is the provision of a new and useful fertilizer attachment constructed and arranged to be connected with a grain drill of the type having furrow openers and means incorporated in the grain drill for raising and lowering the furrow openers. Another feature of this invention is the provision of an adjustable discharge or flow-controlling slide, with new and improved means for releasably holding the slide in position on the bottom portion of the fertilizer hopper.

A further and important feature of this invention is the provision of new and improved slide supporting means whereby the slide may readily be removed from the hopper, as for the purpose of cleaning or the like. Such slideholding means may take either of two forms, one in the nature of a spring-biased cam, which permits the slide to move away from the bottom of the hopper a limited distance, and for a number of times, or such means may take the form of a simplified slide support in which the slide is carried detachably in a pair of supporting parts one or both of which are adjustable relative to the hopper for determining the clearance between the slide and the hopper bottom.

These and other objects and advantages of the present invention will be apparent to those skilled in the art after a consideration of the following detailed description, taken in conjunction with the accompanying drawings, in which:

Fig. 1 is a fragmentary perspective view showing one form of means holding the adjustable slide in position along the bottom of the fertilizer hopper.

Fig. 2 is a generally diagrammatic sectional view taken along the plane of the line 4—4 of Fig. 1, with certain parts added to Fig. 2 that are not shown in Fig. 1.

Fig. 3 is a sectional view taken generally along the line 5—5 of Fig. 1.

Fig. 4 is a fragmentary end view of one of the gate-holding cam members, showing the manner in which the cam member may be inserted in place in the associated bracket.

Figure 5:
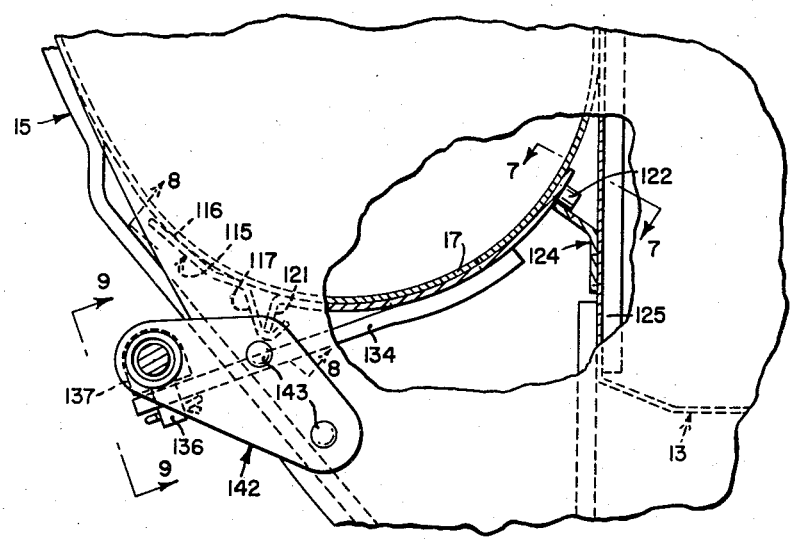
Fig. 5 is a fragmentary end view of a fertilizer hopper mounted in place on a grain drill, showing a modified form of slide and slide-retaining means.
Figure 6:
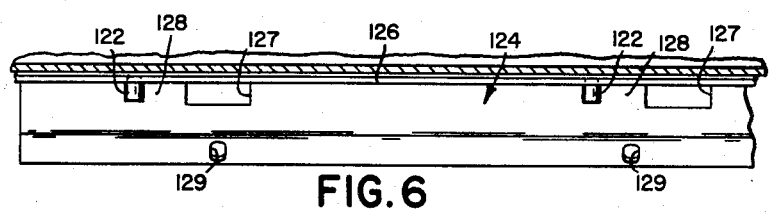
Fig. 6 is a fragmentary sectional view taken generally along the line 7—7 of Fig. 5, showing the front slide support member and associated parts.
Figure 7:
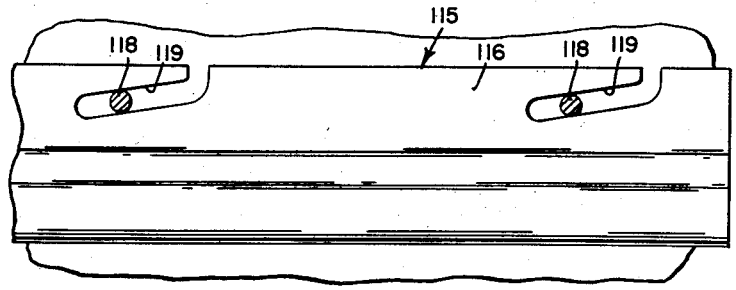
Fig. 7 is a fragmentary sectional view taken generally along the line 8—8 of Fig. 5, showing the rear slide support member and associated parts.
Figure 8:
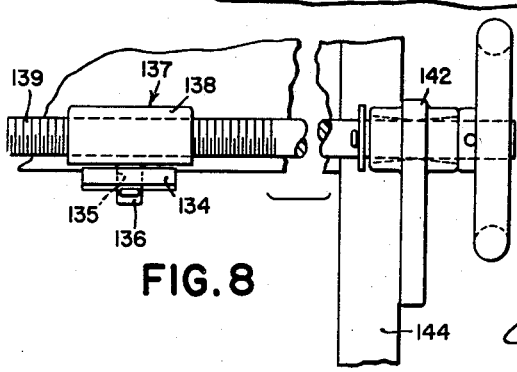
Fig. 8 is a view taken generally along the line 9—9 of Fig. 5, showing the slide-adjusting means employed in the form of the invention shown in Fig. 5.

Referring first to Fig. 1, the principles of the present invention have been shown as embodied in a fertilizer-type grain drill in which a frame supports a seed hopper, as through suitable end plates, and a fertilizer hopper 15 having a lower arcuate bottom 17 in which a plurality of discharge openings are provided. The hopper 15 also contains suitable agitating means (not shown), and flow of fertilizer material from the hopper 15 is controlled by a slide 18 that is carried along the underside of the hopper bottom 17, preferably by means to which reference will be made in detail later. The slide 18 is movable generally longitudinally of the transversely disposed fertilizer hopper 15. The agitating means in the hopper 15, and suitable seed-selecting means, are actuated by any suitable drive connections. The present invention is not particularly concerned with the details of the drive connections, it being sufficient for purposes of the present disclosure to note that they are generally similar to the arrangement shown in the U. S. Patent 2,561,235, issued July 17, 1951, to Schmutzler to which reference may be made if necessary. Also, a grain drill in which the principles of the present invention have been incorporated includes ground-engaging furrow openers and furrow opener raising and lowering means, similar to that shown, for example, in U. S. Patent 2,520,345, issued August 29, 1950, to Starr, to which reference may also be made if necessary.

According to the principles of the present invention, the discharge-controlling slide 18, which is provided with a plurality of openings cooperating with openings formed in the hopper bottom 17, is adapted to be shifted longitudinally of the transverse hopper 15 for the purpose of controlling the amount of fertilizer discharged through the hopper openings. Preferably, according to the provisions of the present invention, the slide-supporting means is constructed and arranged to accommodate ready and convenient detachability of the slide 18 from the bottom of the hopper to facilitate cleaning the slide and associated parts.

One form of slide-supporting means incorporating the principles of the present invention is shown in Figs. 1–4. Referring now to these figures, the front and rear sides of the hopper 15 are provided with a plurality of pairs of front and rear supporting strap members or brackets 71 and 72 secured in any suitable way to the sides of the hopper 15 so as to have depending portions extending below the bottom 17 of the hopper. The front brackets 71 are slotted, as at 75, and the rear brackets or strap members are provided with openings 76, each of which has a lateral extension 77 that provides for sidewise movement of the associated part into and out of the openings 76. Carried in each pair of brackets 71 and 72 is a rotatable cam member 78 having front and rear stems 81 and 82. The cam section 79 of each member 78 carries a slide-engaging roller 83 that is held in position on the part 79 by pins 83a and forms a part of the cam member 78. The roller 83 is disposed, when the stems 81 and 82 are in the bottom portions of the openings 75 and 76 in the brackets 71 and 72, so as to engage the lower face of the slide 18. To attach the member 78, the front stem 81 is first inserted in the opening 75 of the front bracket 71, and then the rear stem 82 is passed through the extension 77 and into position in the openings 76 of the rear bracket 72. The rear stem 82 carries an arm 84 that is apertured to receive one end of a spring 85, the other end of which is anchored to the hopper by a clip 86 or other suitable fastening means. The cam portion 79 is in the nature of an eccentric and the parts are so constructed and arranged that the tension in the spring 85 urges the roller 80 on the cam or eccentric section 79 into engagement with the lower side of the slide 18. The eccentric 79 is not ordinarily on its dead-center position and, therefore, if for any reason fertilizer should begin to build up on the slide 18, the cam or eccentric section 79, together with the arm 84, rocks downwardly to accommodate any downward displacement of the slide 18 due to the hardened fertilizer thereon or on the adjacent portions of the hopper bottom. The several cam members 78 are readily disconnected from the hopper to accommodate removal of the slide 18, merely by disconnecting one end of the spring 85 from the clip 86 and then turning the member 78 so as to lower the eccentric 79, whereupon the member 79 may be withdrawn from the openings 76 through the extension 77, and then withdrawn axially from the openings 75 in the front bracket 71.

According to the present invention, means is provided for shifting the slide 18 longitudinally of the hopper to control the discharge of fertilizer. To this end, as will be seen from Fig. 1, an end clip 91 is fixed to one end of the slide 18 and has a downturned portion 92 provided with a buttonhole-type of opening 93 a portion of which extends into the horizontal part of the clip 91. An adjusting screw 94 is threaded into a fitting 95 fixed to the side 96 of the hopper 15 and the inner end of the screw 94 is reduced, as at 98, so as to extend through the smaller portion of the opening 93. A collar 99 is mounted on the reduced end 98 and is held in position by a pin or cotter 101, the collar 99 lying at the inner side of the downturned portion 92 of the end clip 91. In this way, as will be seen from Fig. 2, turning the screw 94, as by a handle 102 or the like, serves to shift the slide 18 in one direction or the other. The adjusting end of the slide 18 is held in place by means that, unlike the cam 78 and associated parts, does not accommodate any downward displacement of the slide. Where force is applied to the end of the slide to shift the same in one direction or the other, it has been found that downward displacement or the possibility of downward displacement should not be present. Accordingly, the present invention contemplates the provision of two end brackets 105 and 106 attached to the hopper 15 and extending below the slide 18, the downward extension being slotted, as at 107. An L-shaped guide block 109 is adjustably fixed to the lower portion of each of the brackets 105 and 106 by any suitable means, such as a wing nut and bolt arrangement 111. When it is desired to remove the slide 18, the wing nuts are removed and the guide blocks 109 are also removed, after which the slide 18 may be dropped down away from the hopper 15 as explained above. The opening 93 is so constructed and arranged that the downward movement of the slide 18 relative to the adjusting screw 94 is readily accommodated, as will be seen from Fig. 2.

The spring-biased cam members 78 form biased means acting continually to hold the slide 18 up against the bottom of the hopper, but in cases where a spring-biased action of this type is not desirable or necessary, the modified form of slide-holding means shown in Figs. 5 et seq. may be employed. Referring now to these figures, in this form of the invention a slide support 115 in the form of an elongated plate 116 is provided with a generally V-shaped ledge section 117 and is secured to the rear side of the hopper by means of a plurality of pins or studs 118 and associated angled slots 119 formed in the upper edge of the plate member 116. When the studs or bolts 118 are tightened the member 115 is held against lateral displacement, and this holds the ledge section 117 in a given position relative to the bottom of the hopper. This position may be changed, however, by loosening the studs 118 and shifting the plate member 115 in one direction or the other. The slide 18a is, in this form of the invention, provided at one side with a downturned section 121 that normally rests in the V-shaped ledge section 117. The opposite edge of the slide 18a carries a plurality of shoulder rivets 122. These parts cooperate with the upper portion of a second slide support 124 that is attached to the front side of the hopper 15, as through some of the frame members 125 of the grain drill. The upper edge 126 of the slide support 124 is provided with as many notches or slots 127 as there are rivets, and the portions of the slide support section 126 between the notches 127, indicated at 128, form ledges upon which the shoulder rivets 122 rest and which, at the same time, accommodate any longitudinal adjusting movement of the slide 18a. However, when the slide 18a is shifted to bring the shoulder rivets 122 into the notches or slots 127, the forward edge of the slide 18a drops down, and then the rear portion 121 may be lifted away from the ledge section 117 of the rear slide support 115. Preferably, the front slide support 124 is connected to the frame parts 125 by bolt and slot means indicated generally at 129.

In this form of the invention, a shifter plate 134 is riveted or otherwise firmly fixed to the slide 18a and extends rearwardly therefrom, the rear end being apertured, as at 135, to receive the stem 136 of a nut member 137 having an elongated threaded section 138 that receives the inner threaded end of a fertilizer adjusting screw 139. The outer end of the adjusting member 139 is rotatably anchored by any suitable means to an end bracket 142 that is fixed, as at 143, to the adjacent portion of one of the frame members 144 of the hopper support. By turning the member 139, the slide 18a may be shifted along the ledge sections 117 and 128, as to adjust the amount of discharge from the fertilizer hopper. Movement of the slide beyond the adjusting range brings the shoulder rivets into registration with the notches 127. By loosening the fasteners 118 and 129, the position of the slide-supporting strips 115 and 124 may be adjusted to bring the slide 18a to the proper position relative to the bottom of the hopper.

While I have shown and described above the preferred structure in which the principles of the present invention have been incorporated, it is to be understood that my invention is not to be limited to the particular details, shown and described above, but that, in fact, widely different means may be employed in the practice of the broader aspects of this invention.

What I claim, therefore, and desire to secure by Letters Patent is:

1. In a fertilizer distributor, a hopper having openings in the bottom portion thereof, a slide movable along the bottom portion of said hopper and having openings cooperating with said hopper openings to provide the desired rate of flow, and means removably supporting said slide on the bottom portion of said hopper, said slide-holding means including spring biased means extending transversely across said movable slide and contacting the latter between the ends of said spring biased means for resiliently urging said slide against the hopper bottom, said spring biased means accommodating adjusting movement of the slide while resiliently urging the latter against the hopper bottom portion.

2. In a fertilizer distributor, a hopper having openings in the bottom portion thereof, a slide movable along the bottom portion of said hopper and having openings cooperating with said hopper openings to provide the desired rate of flow, brackets fixed to said hopper at each side of said slide and extending below the latter, the lower ends of said brackets being apertured, rotatable cams carried by said brackets and including means engaging said slide, an arm on each cam, and spring means anchored to the hopper and connected with each arm.

3. The invention set forth in claim 2, further characterized by the openings in the brackets at one side of said slide being slotted to detachably receive said rotatable cams.

4. In a fertilizer distributor, a hopper having openings in the bottom portion thereof, a slide movable along the bottom portion of said hopper and having openings cooperating with said hopper openings to provide the desired rate of flow, one edge of said slide having a down turned portion, a first slide support fixed to said housing and having a portion removably receiving the down turned portion of said slide, a second slide support fixed to said hopper bottom at the other side of said slide, the latter having projections and said second slide support having openings receiving said projections when said slide is engaged with said first slide support and then shifted upwardly against the bottom portion of said hopper, axial movement of said slide acting to cause said projections to move behind the adjacent portion of said second slide support, whereby said slide is movably held against the bottom of said hopper.

5. The invention set forth in claim 4, further characterized by means adjustably fixing said slide supports to the hopper to provide for movement of said slide supports toward and away from the bottom portion of said hopper.

6. In a fertilizer distributor, a hopper having openings in the bottom portion thereof, a slide movable along the bottom portion of said hopper and having openings cooperating with said hopper openings to provide the desired rate of flow, a shifter plate disposed generally transversely of said slide and fixed at one end to the latter, the other end being apertured, a nut member having a stem disposed in the aperture in said shifter plate, means removably holding said nut member in said shifter plate, a bracket fixed to the hopper, an adjusting nut member having a screw threaded portion threaded into said nut member and the other end rotatable relative to but held against axial displacement with respect to said bracket, an index pointer plate comprising a generally transverse member fixed at one end to said slide, an index pointer fixed to the other end of said last mentioned transverse part, and an index plate cooperating with said index pointer and fixed to said hopper.

7. In a fertilizer distributor, a hopper having openings in the bottom portion thereof, a slide movable along the bottom portion of said hopper and having openings cooperating with said hopper openings to provide the desired rate of flow, one edge of said slide having a down turned portion, a first slide support adjustably fixed to said housing and having a portion removably receiving the down turned portion of said slide, a second slide support fixed to said hopper bottom at the other side of said slide, and means connecting the other edge of said slide with said second slide support.

8. In a fertilizer distributor, a hopper having openings in the bottom portion thereof, a slide movable along the bottom portion of said hopper and having openings cooperating with said hopper openings to provide the desired rate of flow, at least one edge of said slide being bent downwardly to provide a support-receiving edge, and means removably supporting said slide on the bottom portion of said hopper, said slide-holding means including a slide support having an upturned ledge section receiving said edge, and means mounting said slide support on said hopper.

9. The invention set forth in claim 8, further characterized by said mounting means including angled sections on said slide support and associated parts fixed to the hopper and supportingly receiving said angled sections, said angled sections being shiftable along said parts.

10. In a fertilizer distributor, a hopper having openings in the bottom portion thereof, a slide movable along the bottom portion of said hopper and having openings cooperating with said hopper openings to provide the desired rate of flow, one edge of said slide having a down turned portion, a slide support adjustably fixed to said housing and having a portion removably receiving the down turned portion of said slide means on the hopper supporting the other edge of said slide.

11. In a fertilizer distributor, a hopper having openings in the bottom portion thereof, a slide movable along the bottom portion of said hopper and having openings cooperating with said hopper openings to provide the desired rate of flow, one edge of said slide having a down turned portion, a slide support adjustably fixed to said housing and having a portion removably receiving the down turned portion of said slide, and slide moving means comprising a part fixed to the slide and extending therefrom below and outwardly from said slide support, a bracket fixed to the adjacent end of the hopper, and slide-adjusting means connected to act between said slide and said bracket.

12. In a fertilizer distributor, a hopper having openings in the bottom portion thereof, a slide movable along the bottom portion of said hopper and having openings cooperating with said hopper openings to provide the desired rate of flow, a shifter plate disposed generally transversely of said slide and fixed at one end to the latter, the other end being apertured, a nut member having a stem disposed in the aperture in said shifter plate, means removably holding said nut member in said shifter plate, a bracket fixed to the hopper and an adjusting nut member having a screw fitted portion threaded into said nut member and the other end rotatable relative to but held against axial displacement with respect to said bracket.

13. In a fertilizer distributor, a hopper having openings in the bottom portion thereof, a slide movable along the bottom portion of said hopper and having openings cooperating with said hopper openings to provide flow control, and means removably supporting said slide on the bottom portion of said hopper, said slide-holding means including spring biased means extending transversely across said movable slide and contacting the latter between the ends of said spring biased means for resiliently urging said slide against the hopper bottom.

14. In a fertilizer distributor, a hopper having openings in the bottom portion thereof, a slide movable along the bottom portion of said hopper and having openings cooperating with said hopper openings to provide the desired rate of flow, one edge of said slide having a down turned portion, a first slide support fixed to said housing and having an upturned portion removably receiving the down turned portion of said slide, and a second slide support fixed to said hopper bottom at the other side of said slide.

References Cited in the file of this patent
UNITED STATES PATENTS

| | | |
|---|---|---|
| 1,418,169 | Printz | May 30, 1922 |
| 1,722,713 | Smith | July 30, 1929 |
| 2,661,125 | Gandrud | Dec. 1, 1953 |